US005539287A

United States Patent [19]
Gallagher et al.

[11] Patent Number: 5,539,287
[45] Date of Patent: Jul. 23, 1996

[54] ROLL-TAPE KNIFE CONTROL FOR A TAPE-CUTTING APPARATUS IN A MAILING MACHINE

[75] Inventors: Dennis M. Gallagher, Danbury; John R. Nobile, Fairfield; Thomas M. Pfeifer, Bridgeport, all of Conn.

[73] Assignee: Pitney Bowes, Stamford, Conn.

[21] Appl. No.: 203,132

[22] Filed: Feb. 28, 1994

[51] Int. Cl.[6] .................... H02P 1/00
[52] U.S. Cl. .................... 318/285; 318/282; 318/466
[58] Field of Search .................... 318/280–300, 318/445, 446–470

[56] References Cited

U.S. PATENT DOCUMENTS 4,463,293 7/1984 Hornung et al. .................... 318/284
5,355,068 10/1994 Eckert et al. .................... 318/282
5,386,182 1/1995 Nikami .................... 318/293

*Primary Examiner*—David S. Martin
*Attorney, Agent, or Firm*—Steven J. Shapiro; Melvin J. Scolnick

[57] ABSTRACT

A tape cutting mechanism uses a bi-directional motor and a clutch arrangement. However, with the use of such a clutch in an inexpensive open loop control system, the dynamic energy stored in the motor armature at the initiation of the cutting sequence is greater than the maximum energy required and the maximum cutting energy requirements vary considerably. Leftover energy is removed from the system in order to prevent a large impact at the end of its stroke which may damage the clutch mechanism and to decrease the noise by controlling the bi-directional motor for oscillating a member for cutting a tape and for feeding the cut tape. The method comprises operating the motor for a predetermined length of time in a first direction at a predetermined duty cycle, reversing the motor for a shorter predetermined length of time for slowing it down, thereafter running the motor in the first direction while incrementally reducing the duty cycle to assure that the member has been moved to a maximum position in a first direction and to limit its impact as the member reaches the maximum position, and thereafter reversing the motor to move the member to a maximum position in the opposite direction. At least some of the times and duty cycles for operation may be stored in non-volatile memory.

4 Claims, 7 Drawing Sheets

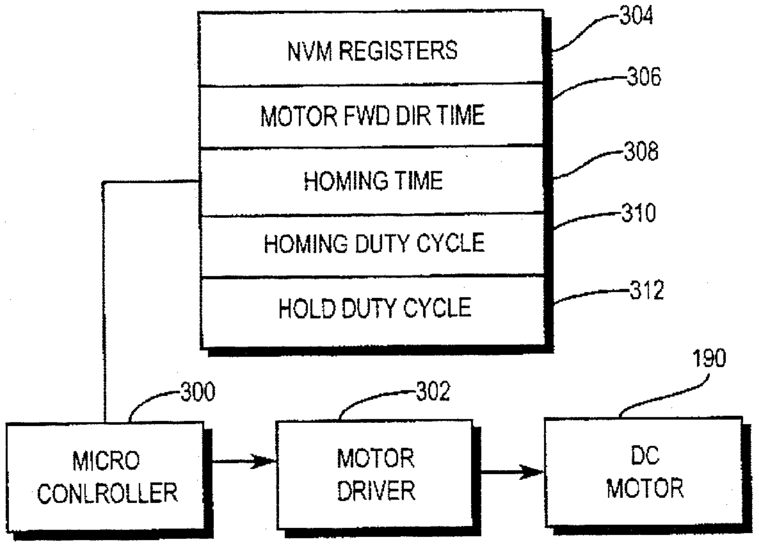
FIG . 7
FIG. 8
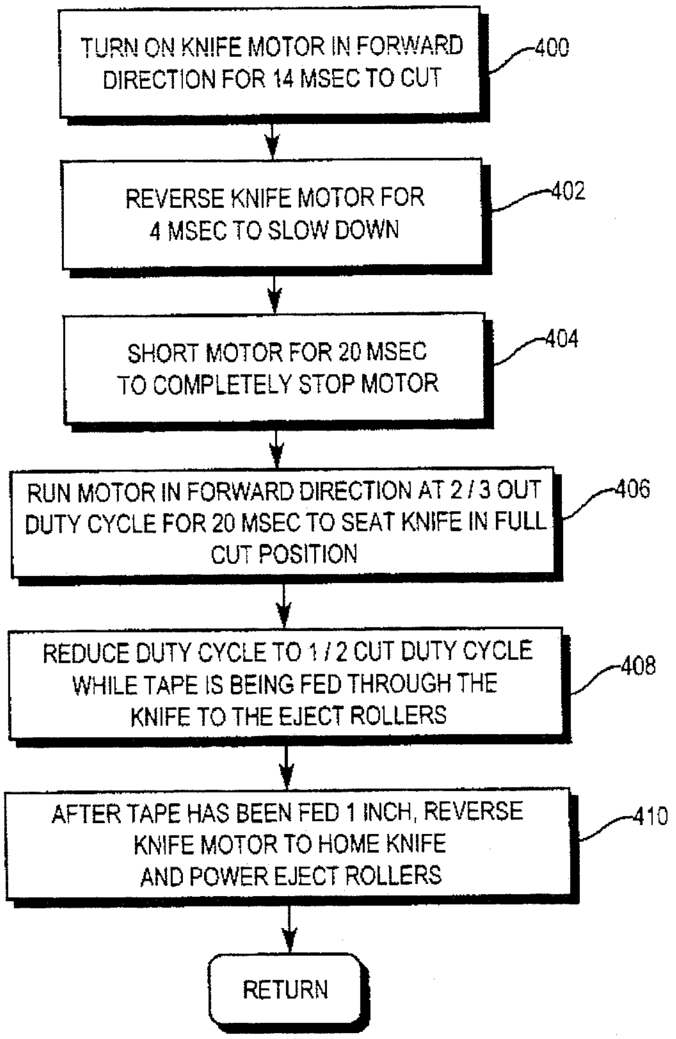

ROLL-TAPE KNIFE CONTROL FOR A TAPE-CUTTING APPARATUS IN A MAILING MACHINE

FIELD OF THE INVENTION

The invention relates to mailing machines and more particularly tape dispensing units associated with the mailing machines.

BACKGROUND OF THE INVENTION

This application is related to the following five applications and patents concurrently filed directed to a tape feeding, cutting and ejecting apparatus for a mailing machine: Ser. No. 08/203,130, for Method for Preventing Jams in a Tape Ejecting Apparatus; U.S. Pat. No. 5,452,214, for Method for Initializing a Tape Feeding, Cutting and Ejection Apparatus for a Mailing Machine; Ser. No. 08/203,459, for Method for Controlling Speed in a Tape Feeding, Cutting and Ejection Apparatus for a Mailing Machine; Ser. No. 08/203,130, for Method for Control of Length of Imprint for a Mailing Machine; and U.S. Pat. No. 5,415,484, for Method and Apparatus for Cutting Mailing Machine Roll Tape, all assigned to the assignee of the present invention.

In addition it is related to the following applications Ser. No. 180,161 and Ser. No. 180,168 for Tape Feeding, Cutting and Ejecting Apparatus for a Mailing Machine filed Jan. 11, 1994 and Ser. No. 180,163 for Mailing Machine also filed Jan. 11, 1994, all assigned to the assignee of the present invention.

Typically, in known mailing machine tape dispensers the tapes are cut using a solenoid actuated knife arrangement under control of a microcomputer as disclosed, for example, in U.S. Pat. No. 4,665,353.

In the mailing machine described in applications Set. No. 180,161 and Ser. No. 180,168, there is shown a rotary knife which is used to sever a roll tape and provide a deflecting lip for directing the cut tape into an exit path. It was found to be desirable to use a one-revolution clutch to disengage the motor from the knife so that the motor allows the knife to perform its cut in less than one revolution.

SUMMARY OF THE INVENTION

However, with the use of such a clutch in an inexpensive open loop control system, the dynamic energy stored in the motor armature at the initiation of the cutting sequence is greater than the maximum energy required. Since the maximum cutting energy requirements may vary considerably between knives and in dependence upon various environmental conditions, there may be a significant amount of leftover energy. It has been found necessary to remove this energy from the system in order to prevent a large impact at the end of its stroke which may damage the clutch mechanism.

It is therefore an object of the invention to provide a method for controlling a knife for cutting tape quietly, reliably and efficiently with a small DC motor.

This and other objects are attained in a method for controlling a bi-directional motor for oscillating a member for cutting a tape and for feeding the cut tape, the method comprising the steps of operating the motor for a predetermined length of time in a first direction at a predetermined duty cycle, reversing the motor for a shorter predetermined length of time for slowing it down, thereafter running the motor in the first direction while incrementally reducing the duty cycle to assure that the member has been moved to a maximum position in a first direction and to limit its impact as the member reaches the maximum position, and thereafter reversing the motor to move the member to a maximum position in the opposite direction.

In a preferred embodiment, at least some of the times and duty cycles for operation are stored in non-volatile memory for access by a micro controller for controlling the motor.

BRIEF DESCRIPTION OF THE DRAWING

FIG. 7 is a circuit block diagram of the control arrangement for the knife motor.

FIG. 8 is a flow chart of the operation of the DC motor control during the cut operation.

DESCRIPTION OF THE PREFERRED EMBODIMENT

Figure 1:
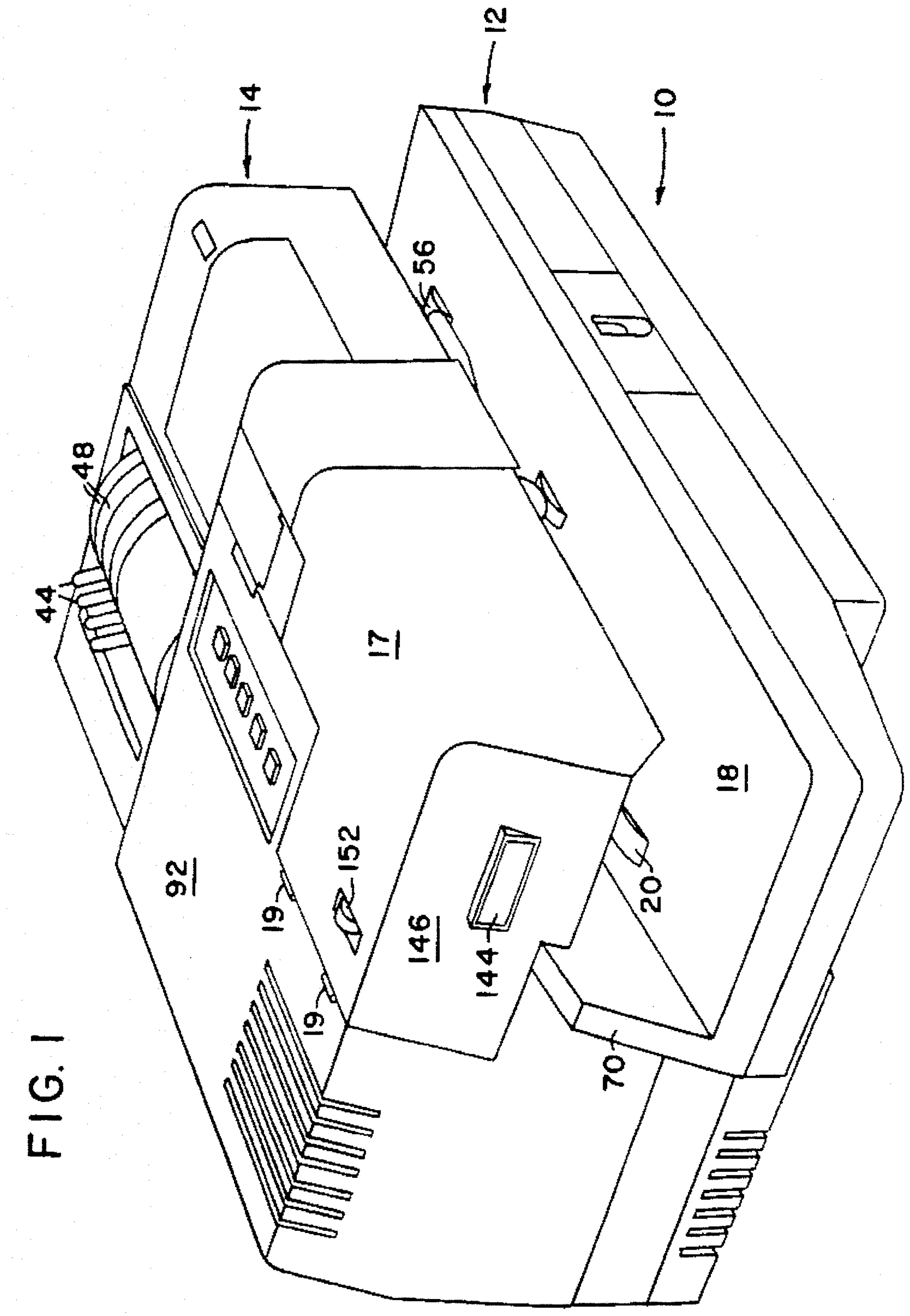
FIG. 1 is a general perspective view of a mailing machine embodying the present invention.
Figure 2:
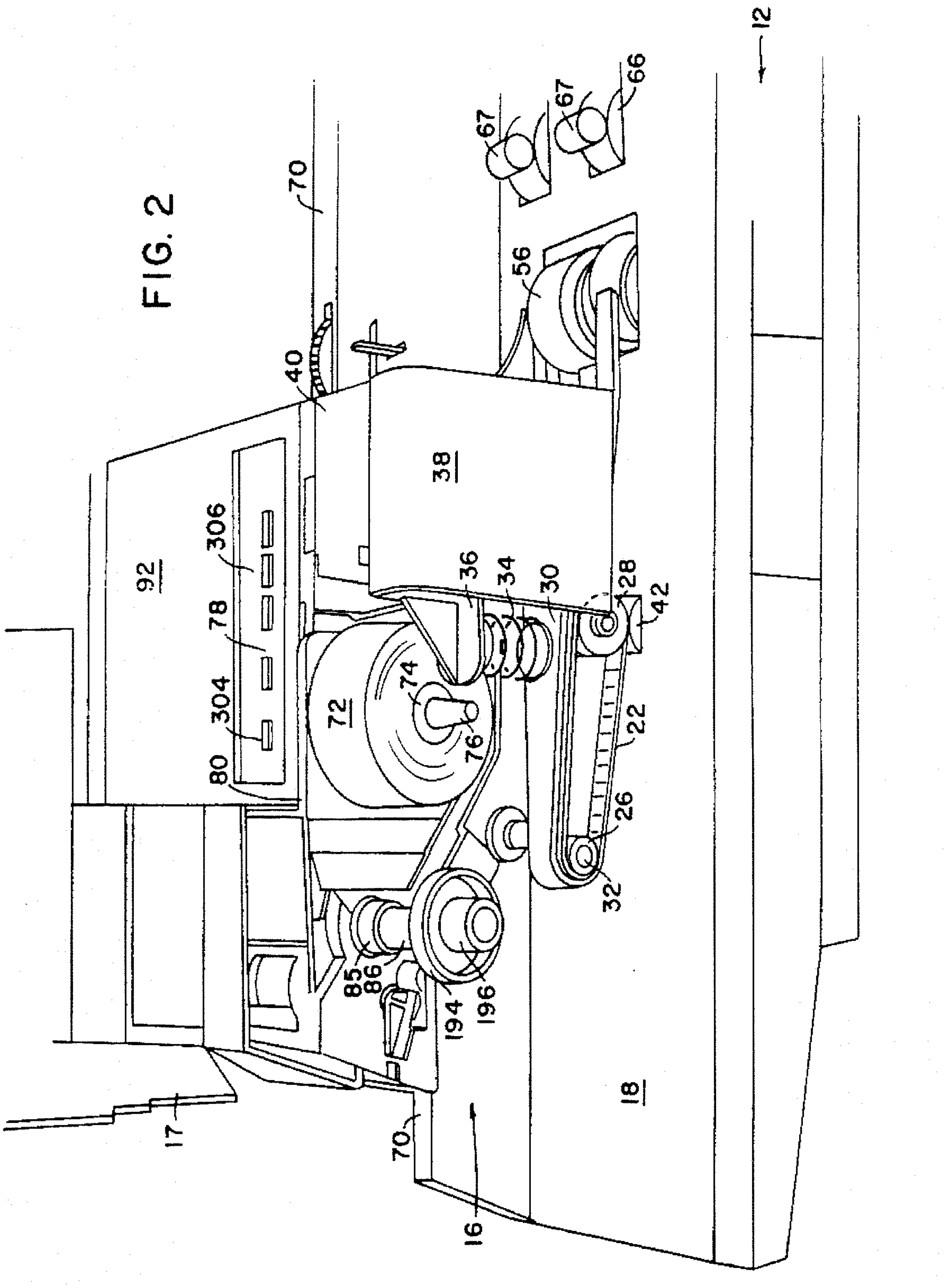
FIG. 2 is a frontal perspective view of the mailing machine shown in FIG. 1 with some covers removed to expose details.

In FIGS. 1 and 2, there is shown generally at 10 a mailing machine as described generally in applications Ser. No. 180,163 (Issued as U.S. Pat. No. 5,329,704) for Mailing Machine, Ser. No. 180,161 (Issued as U.S. Pat. No. 5,392,703) and Ser. No. 180,168 (Issued as U.S. Pat. No. 5,390,594) for Tape Feeding, Cutting and Ejecting Apparatus for a Mailing Machine all filed Jan. 11, 1994, each assigned to the assignee of the present invention and specifically incorporated herein by reference.

The mailing machine includes a base shown generally at 12, a postage meter generally designated at 14, and a tape feeding, cutting, and ejection apparatus shown generally at 16 (FIG. 2). The mailing machine preferably includes a housing having a pivoted cover 17 connected by hinges 19 which can be raised to provide access.

The base 12 comprises a feed deck 18 which extends through the mailing machine 10 for support of mailpieces. Feeding rollers 20 project upward through the deck for engaging the underside of the mailpieces while belt 22 which extends around drive pulley 26 and idler pulley 28 serves to engage the upper surface for transporting the mailpiece for feeding to the postage meter. The outer surface of belt 22 passing around idler pulley 28 is mounted on elongate housing 30 which is pivoted about shaft 32 which drives the pulley 26. Housing 30 is spring loaded downwardly by spring 34 on bracket 36 formed on ink cartridge housing 38 which holds a removable ink cartridge 40. Belt 22 engages an idler roller 42 mounted beneath the feed deck 18 which acts as a pressure backup to ensure proper feeding of mailpieces between the belt 22 and idler roller 42.

Figure 3:
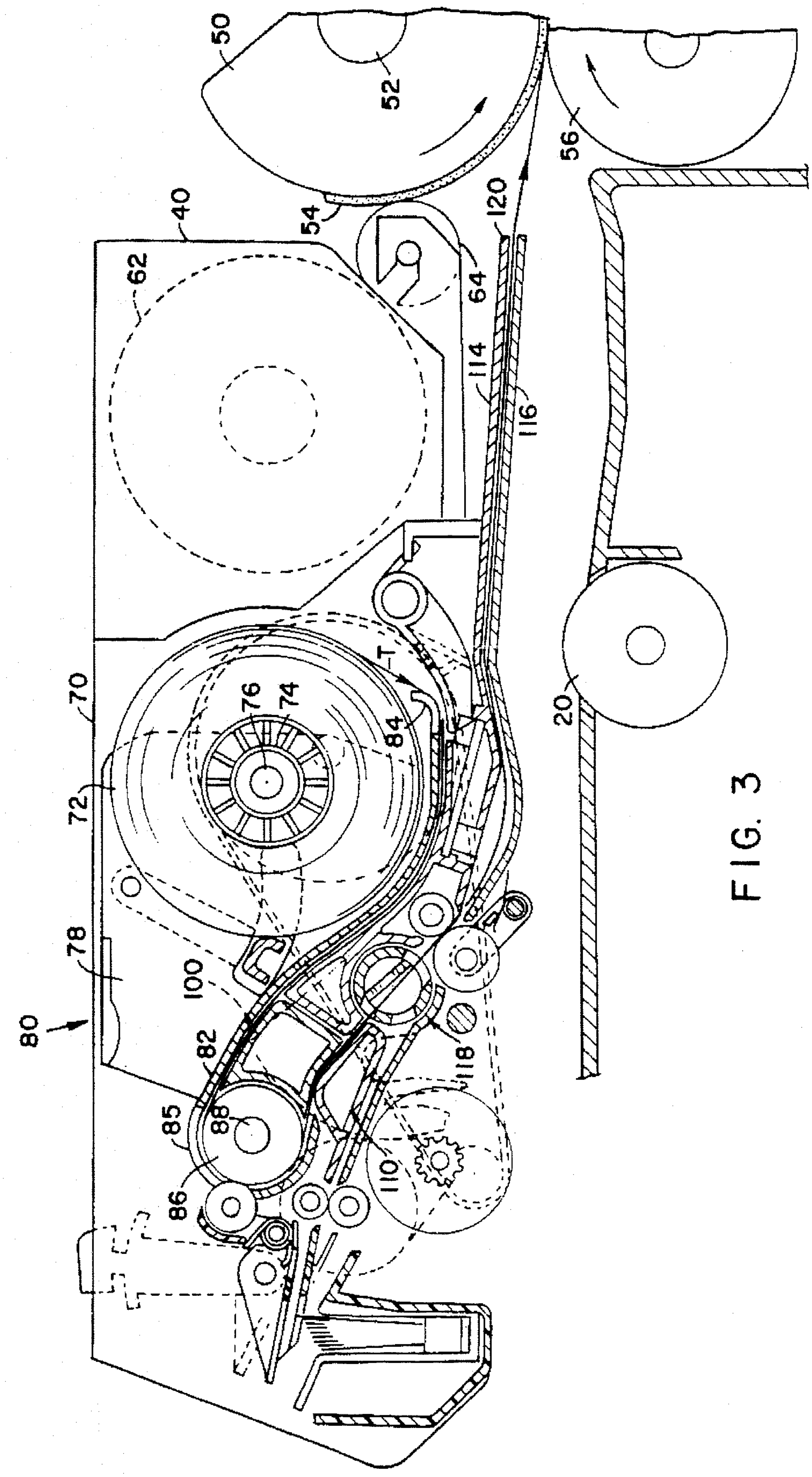
FIG. 3 is a view of the tape feeding, cutting and ejecting apparatus shown in place in the mailing machine.

Postage meter 14 has a plurality of setting levers 44 for setting postage in accordance with numerals on scales 48. As seen in FIG. 3 the postage meter includes print drum 50 mounted on shaft 52 which is driven for rotation of the drum. Drum 50 carries a printing die 54 for printing the indicia on a mailpiece pressed into firm engagement by impression rollers 56. The ink cartridge 40 contacts spring loaded transfer roller 64 for transferring ink to the printing die 54 on each revolution of the printing drum.

Returning to FIG. 2, the base further includes a plurality of eject rollers 66 and cooperating spring loaded pressure rollers 67 for conveying the mailpiece to the end of the feed deck.

Figure 4:
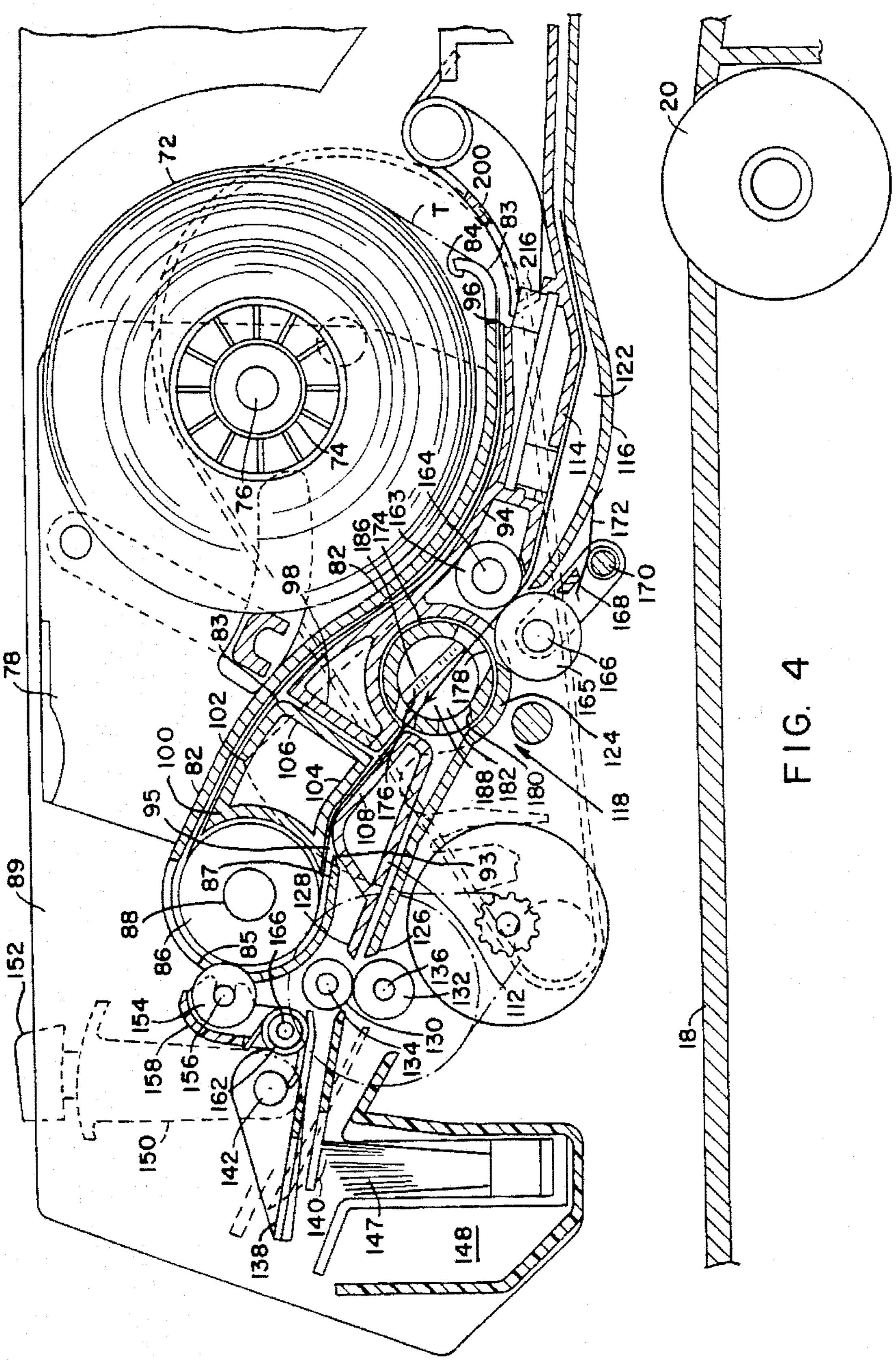
FIG. 4 is a view similar to FIG. 3 but drawn to enlarged scale and partly in longitudinal section to reveal particular details.

Referring now to FIGS. 3 and 4, the base 12 includes a wall 70 (also in FIGS. 1 and 2). The tape feeding, cutting and ejection apparatus 16 is mounted on the wall 70. Apparatus 16 includes a roll of tape 72 suitably mounted on spindle 74 which in turn is mounted on tape holding means which includes stub shaft 76 fixed to an upstanding wall 78 of a movable mounting frame designated generally at 80.

The mounting frame 80 also includes an upper guide plate 82 and has an upturned lip 84 which forms an entrance guide for the strip of tape "T" as it comes off the roll. The upper guide plate terminates in a pair of spaced apart U-shaped portions 85 which fit closely around the outer periphery of a drum shaped tape feed roller 86 fixedly mounted on shaft 88.

As best seen in FIG. 4, the strip is threaded through slot 83 formed formed by the lower surface of the upper guide plate 82 and guide wall 102. The U-shaped portions terminate in a flat portion 87 which is tapered to form a cutting edge 93 against which the free end of tape T is pulled, after it exits through slot 95 defined by edge 93 and guide wall 104. The lower guide plate 94 is disposed contiguously with guide plate 82 over most of its length commencing at end 96 and extending to wall 98.

An upper intermediate guide portion indicated at 100 is arranged in the space between wall 98 and tape feed roller 86 and includes the guide walls 102 and 104 and an upright wall 106 between the walls 102 and 104. The lower guide wall 104 is disposed in close relationship with an upper guide wall 108 of a lower intermediate guide portion designated by 110. This intermediate portion 110 has a lower guide wall 112.

A second set of guide plates 114 and 116 extend generally from a point adjacent a severing mechanism 118 to another point 120 adjacent the nip of the printing drum 50 and the impression roller 56. There is a short span where these guide plates are separated by a substantially larger distance to form a gap 122. The foregoing plates all define a first feed path for the tape.

Another elongate guide plate 124 extends rearwardly from beneath the severing mechanism 118 to an opposite end 126. The lower guide wall 112 of the intermediate guide portion 110 also has an end 128 located adjacent to the end 126 of the guide plate 124. A pair of feed rollers 130 and 132 are mounted on shafts 134 and 136 respectively.

On the opposite side of the feed rollers 130 and 132 is a tape deflector having closely spaced apart upper and lower guide plates 138 and 140 which are suitably connected together to form an integral unit which is fixedly mounted on on shaft 142. The deflector plates 138 and 140 lead to an outlet opening 144 (FIG. 1) formed in the side wall 146 of the cover. Lever 150 is suitably connected to shaft 142 and terminates upwardly in in a finger button 152 which projects through a top wall 92 to allow the operator to oscillate the shaft 142 back and forth to move the deflector plates 138 and 140 between the solid lines and dotted line position seen in FIG. 4. It will be noted that with the plates in the solid line position, a cut piece of tape is directed under the deflector plate 140 and over the top of the bristles 147 of moistening device 148. If in the dotted position, the deflector plates prevent the tape from being moistened and it is sent directly to the opening 144.

The tape feeding means comprises tape feed roller 86 and idler roller 154 which is rotatably mounted on shaft 156 fixed in frame 158, which in turn is pivotally mounted on shaft 160. Coil spring 162 is wrapped around the shaft 160 so that the ends bear against the frame 158 and the upper surface of deflector plate 138 to urge the frame 158 toward the feed roller 86, and thereby pressing the idler roller 154 into firm engagement with the tape as it passes around the feed roller 86.

Another feed roller 163 is fixedly mounted on a shaft 164 which is rotatably mounted in the frame. A pair of backup idler rollers 165 are mounted on shaft 166 which is rotatably mounted in frame 168 which in turn is pivotally mounted on another shaft 170 which is mounted on the frame walls. Coil spring 172 is mounted on the shaft 170 to urge the idler roller 165 toward the feed roller 163 to provide firm driving engagement between the feed roller 163 and the tape.

It will be appreciated that the feed roller 86 and backup idler roller 154, the feed roller 163 and backup idler roller 165 are all in the first path and serve both to feed the tape and to bring it back to the point where the tape is severed. The set of feed rollers 130 and 132 are disposed in a second path for ejecting the severed piece of tape.

The severing mechanism 118 comprises a cylindrical tubular member 174. This member has a plurality of axially elongate slots through which the tape passes, both in forward and reverse movements. Slot 176 provides an entrance for the tape and a second slot 178 provides an exit. A third slot 180 is formed on the same side as slot 176 to provide an exit for the severed portion of the tape and to direct the tape into the second feed path for ejection of the tape.

A movable cutting member or knife 182 is rotatably mounted in the tubular member 174, the cutting member having a close tolerance fit within the member 174. The knife 182 has a flat surface 186 which is angled slightly and defining a sharpened edge 188 which functions as a moveable blade for cutting the tape when the cutting member 182 is rotated. When the blade moves, it not only severs the tape but depresses the leading edge of the cut piece of tape to the lower slot 180 to direct the cut piece into the second path.

Figure 5:
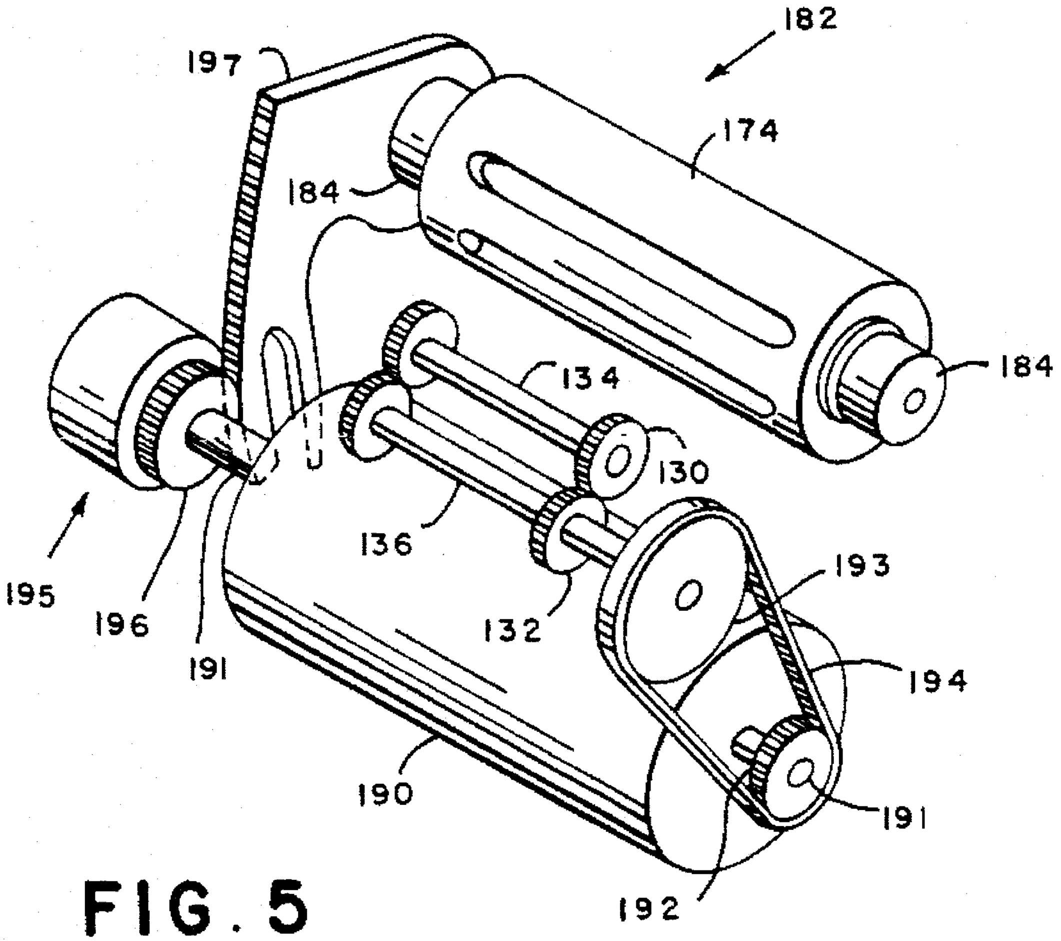
FIG. 5 is a perspective view of the rotary knife and drive mechanism which operates the knife and the feed rollers.

FIG. 5 is a perspective view of the rotary knife and drive mechanism which operates the knife and the feed rollers. As seen here, motor 190 is suitably mounted beneath guide plate 124. The motor has a drive shaft 191 which extends outwardly from both ends of the motor, one end operating the tape severing mechanism 118 and the other end operating the feed rollers 132, both in the manner to be described.

Timing gear 192 is rotatably mounted on the shaft 191, with a one-way friction clutch interposed so that the shaft 191 is in driving engagement with gear 192 only when the shaft is rotating in one direction. Another timing gear 193 is fixedly mounted on shaft 136 which carries the tape feed rollers 132. Timing belt 194 extends about gears 191 and 193 to drive the tape feed rollers 132 to feed the severed tape along the second feed path to exit the machine. When the motor is reversed to drive the shaft in the opposite direction, the one-way clutch prevents the gear 192 from being driven which in turn prevents the feed roller 132 from being driven in order to avoid pulling any pieces of tape back into the apparatus. The other end of shaft 191 is connected to a clutching device indicated at 195 and functions to control the oscillatory movement of the severing mechanism 118.

Gear 196 meshes with gear segment 197 such that arcuate motion of the gear segment 197 causes corresponding rotation of the tubular member 174 (FIG. 4) in the same direction. The clutching device 195 comprises two wrap spring clutches which operate to allow the motor 190 to drive the segment 197 in both directions. Further details are available from applications Ser. No. 180,161 and Ser. No. 180,168 for Tape Feeding, Cutting and Ejecting Apparatus for a Mailing Machine previously incorporated by reference and will not be further described here.

Figure 6:
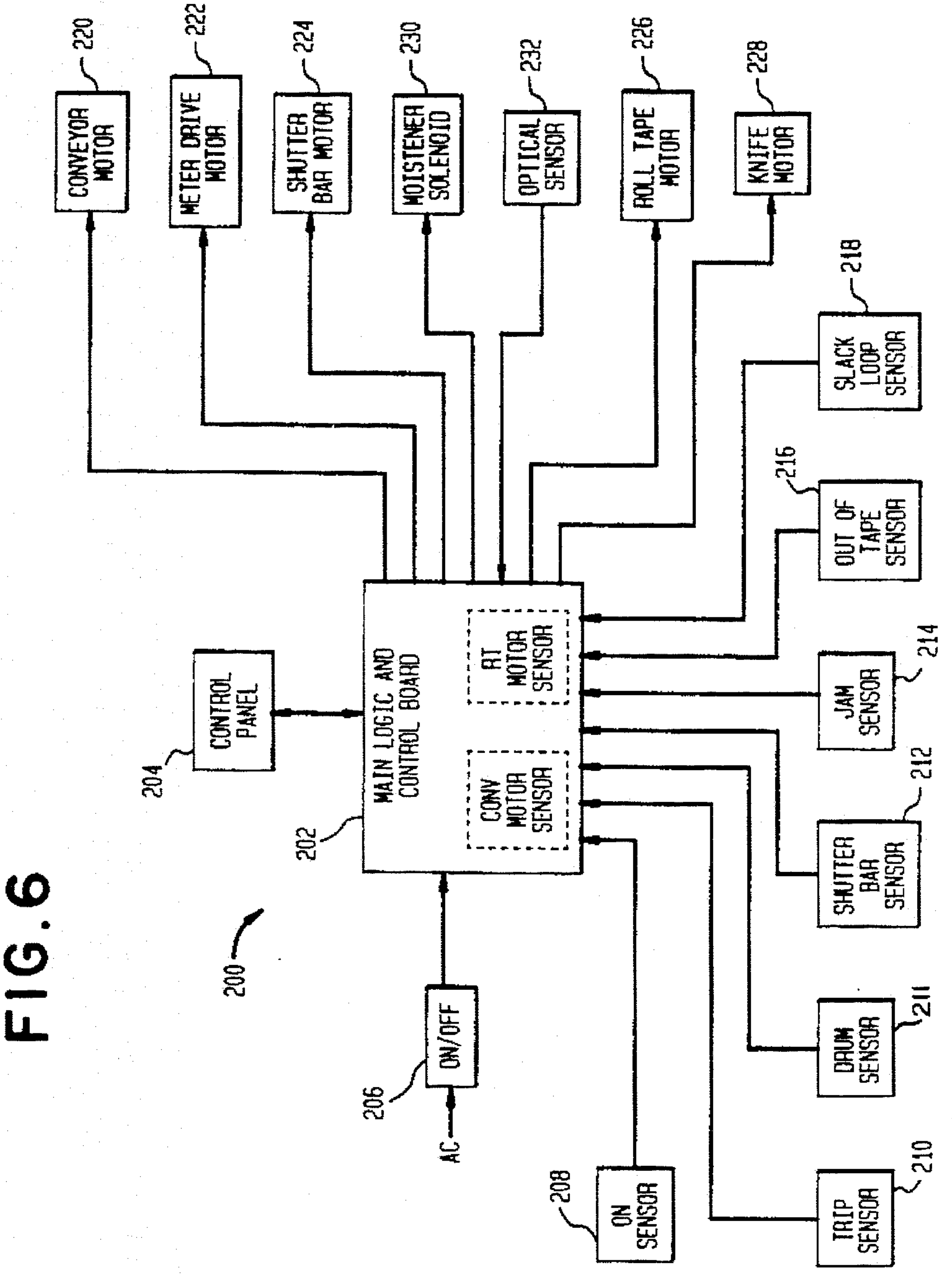
FIG. 6 is a schematic block diagram of the electronic components of the mailing machine.

FIG. 6 is a circuit block diagram of the mailing machine. As seen generally at 200, the main logic and control board 202 receives information from a control panel 204 when A/C power has been applied via on/off switch 206. Various sensors, such as those illustrated for determining the ON condition, 208; trip sensor, 210; drum sensor, 211; shutter bar sensor, 212; jam sensor, 214; out-of-tape sensor, 216; and slack loop sensor, 218 provide information to the control board 202 about the state of the machine while the board outputs information for driving the various motors and solenoids. These motors are the conveyor motor, 220; the meter drive motor, 222; the shutter bar motor, 224; the roll tape drive motor, 226; and a knife motor, 228, which as disclosed herein may be the roll tape drive motor. The board also provides control information to the moistener solenoid 230 and receives optical count data indicated here at block 232 from an optical sensor and slotted rotating disc operatively connected to the roll tape motor.

FIG. 7 is a circuit block diagram of the control arrangement for the knife motor. The micro controller 300 provides an output signal to the driver 302. This may be made by way of a digital output to a DAC or by other means well known in the art. The driver 302 in turn controls the operation of the DC motor 190. Preferably, the controller 300 communicates with Non-volatile Memory (NVM) 304 in which the registers store among other data, information as to the Time for Motor Operation in the Forward Direction as indicated at 306, Homing Time at register 308, Homing Duty Cycle at 310, and Hold Duty Cycle at 312 to obtain the necessary data for operation of the motor. It will be understood that other parameters may be stored as desired.

FIG. 8 is a flow chart of the operation of the DC motor control during the cut operation. In accordance with the invention, the motor is operated in the forward direction for 14 msec, block 400. This length of time is chosen under the assumption that the motor in this amount of time has stored sufficient kinetic energy to complete the cut. Preferably the cut time is stored in NVM where it can be reprogrammed if necessary. The motor is then powered in the reverse direction for 4 msec, block 402, to slow down the knife to reduce noise and impact on the clutch mechanism. In this case the reverse duty cycle is the same as the cut duty cycle, and is preferably compensated for line voltage. The motor is then shorted for 20 msec, block 404 to bring it to a complete stop.

At this point a small forward current is applied, block 406, suitably at ⅔ of the cut duty cycle for approximately 20 msec to assure that the knife is seated in its full cut position before the tape is ejected. Preferably, both the homing time and the duty cycles are stored in NVM. While the tape is being fed to the eject rollers, the motor is powered in the forward direction at approximately ½ of the cut duty cycle, block 408. This may be considered a continuation of the homing operation, but the duty cycle is further reduced to lessen the impact on the clutch mechanism. The hold duty cycle is maintained until the has reached the ejection rollers and then the motor is reversed, block 410, to return the knife to the home position and to drive the ejection rollers. The hold duty cycle is also preferably stored in NVM and compensated for line voltage.

What is claimed is:

1. A method for controlling a bi-directional motor for oscillating a member for cutting a tape and for feeding the cut tape, the method comprising the steps of operating the motor for a predetermined length of time in a first direction at a predetermined duty cycle, reversing the motor and driving it in a second direction opposite to the first direction for a shorter predetermined length of time for slowing it down, shorting the motor until it stops, thereafter running the motor in the first direction while incrementally reducing the duty cycle to assure that the member has been moved to a maximum position in one direction and to limit its impact as the member reaches the maximum position, and thereafter reversing the motor and moving the member to a maximum position in another direction opposite to the one direction.

2. The method of claim 1 further comprising the step of storing at least one of the times and duty cycles for operation in non-volatile memory for providing data for control of the motor.

3. A method for controlling with a micro controller the operating of a bi-directional motor for oscillating a rotary knife blade for cutting a tape and for driving feed rollers for feeding the cut tape, the method comprising the steps of storing data representative of lengths of time of operation of the motor in a non-volatile memory for accessing by the micro controller, operating the motor for a predetermined length of time in a first direction at a predetermined duty cycle in accordance with data in the non-volatile memory, reversing the motor and driving it in a second direction opposite to the first direction for a shorter predetermined length of time in accordance with data in the non-volatile memory for slowing it down, thereafter running the motor in the first direction while incrementally reducing the duty cycle in accordance with data in the non-volatile memory to assure that the rotary knife blade has been moved to a predetermined maximum position in one direction and to limit its impact as the knife reaches the maximum position, and thereafter reversing the motor in accordance with data stored in the non-volatile memory to move the knife to a maximum position in another direction opposite to the one direction.

4. The method of claim 3 further comprising the step of the motor continuing driving of the feed rollers when the knife has reached its maximum position in the another direction.

* * * * *